(No Model.)
D. F. & W. E. OVERTON.
APPARATUS FOR DRYING FISH REFUSE.
No. 520,269. Patented May 22, 1894.
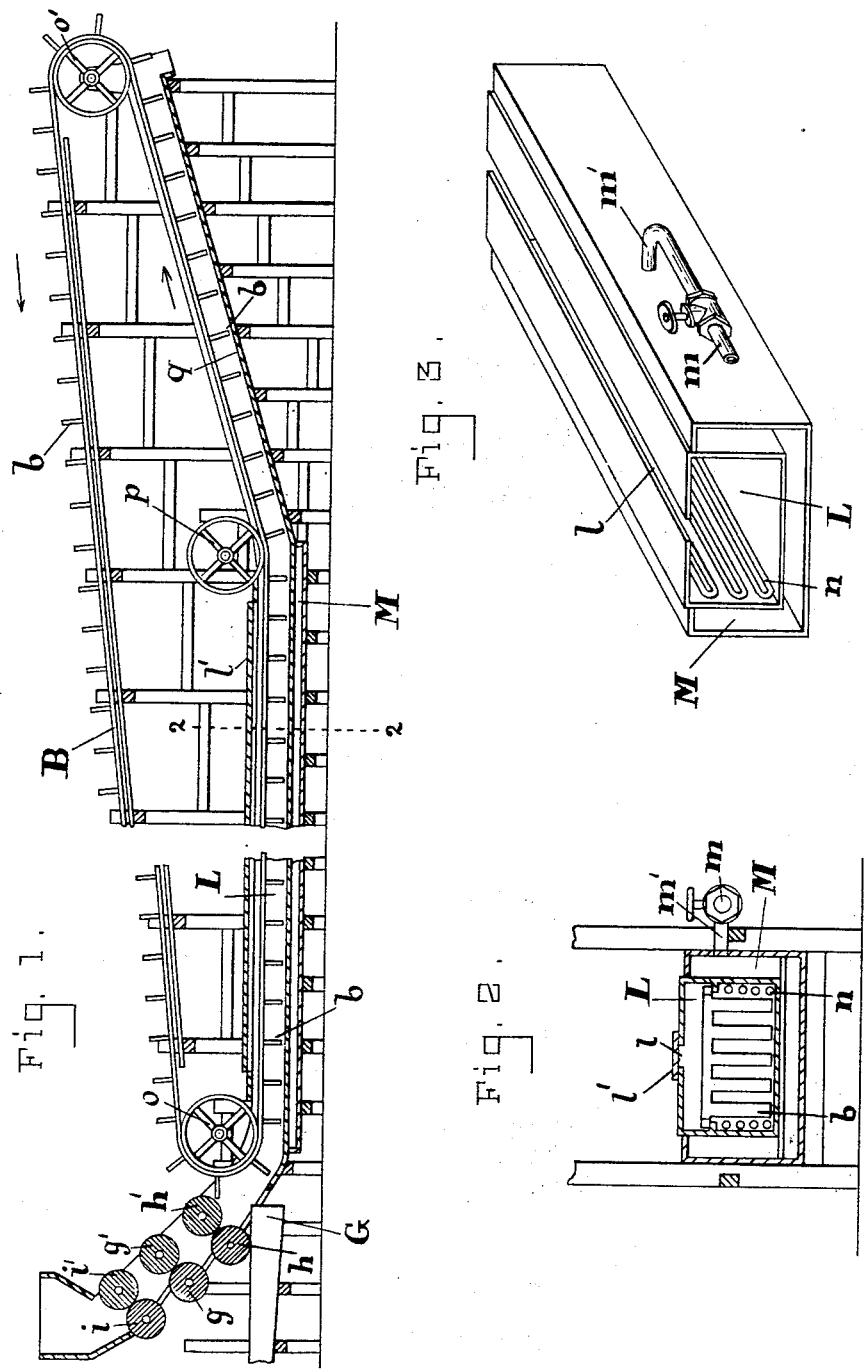
WITNESSES:
L. Ismy Van Horn.
Charles B. Mann Jr.
INVENTORS
D. F. Overton
W. E. Overton
By Chas B. Mann
ATTORNEY.

UNITED STATES PATENT OFFICE.

DANIEL F. OVERTON AND WILLIS E. OVERTON, OF SOLOMON'S, MARYLAND.

APPARATUS FOR DRYING FISH-REFUSE.

SPECIFICATION forming part of Letters Patent No. 520,269, dated May 22, 1894.

Application filed September 21, 1893. Serial No. 486,111. (No model.)

*To all whom it may concern:*

Be it known that we, DANIEL F. OVERTON and WILLIS E. OVERTON, citizens of the United States, residing at Solomon's, in the county of Calvert and State of Maryland, have invented certain new and useful Improvements in Apparatus for Drying Fish-Refuse, of which the following is a specification.

Our present invention relates to improved means for drying cooked fish-refuse (meat and bones), so as to put the material in condition for use in the manufacture of fertilizers.

This apparatus is used by us in connection with our apparatus for cooking the fish and extracting the oil therefrom, for which we filed an application for Letters Patent March 24, 1893, Serial No. 467,417, and is shown and described therein but not claimed.

The accompanying drawings illustrate the invention.

Figure 1 is a vertical longitudinal section of the apparatus. Fig. 2 is a cross section of the apparatus in line 2—2. Fig. 3 is a perspective view of the tunnel.

The compression rollers, $g$, $g'$, $h$, $h'$, $i$, $i'$, first press the cooked fish and express any water or oil that they contain; the water and oil are caught in a pan G. An endless chain carrier, B, passes over two drums or wheels, $o$, $o'$, the latter being elevated; a third drum or wheel, $p$, is employed at the lower end of the incline, $q$, leading up to the elevated drum. This endless carrier has one extremity adjacent to the compression rollers above mentioned, and receives the compressed fish-refuse as it leaves the rollers and conveys it into the evaporator tunnel, L, in which is a tight steam jacket, M, which surrounds the bottom and two sides of the evaporator-tunnel and into which jacket steam is admitted through steam-pipes, $m'$, leading from steam-pipe, $m$. The tunnel, L, is rectangular in cross section and of considerable length, say from one hundred to two hundred feet, and throughout its length is inclosed by the steam-jacket, M. The lower stretch only of the endless carrier passes through the drying-tunnel while its upper stretch is entirely without the tunnel. By this arrangement the tunnel is made smaller and can be heated more effectively. The interior of the tunnel is provided with heating pipes, $n$, extending along the sides or arranged in any preferred way; these pipes are for the circulation of steam or hot water to produce dry heat within the tunnel through which the fish-refuse is slowly passing. The blades, $b$, on the carrier, B, are formed by a number of tines or fingers which depend below and rake along the bottom of the drying tunnel. The tines or fingers of alternate blades are staggered with respect to those of the other blades, so that no two successive blades follow the same track or path around the way, the object being to stir up the fish refuse so that it will be as much as possible accessible to the drying effect of the heat. There is a longitudinal slot, $l$, in the top of the evaporator-tunnel, and removable covers, $l'$, close said slots if desired, but it is deemed preferable to leave a slight open space between said covers, to allow the escape of vapors from the fish as they are drying. By means of this longitudinal slot, the arm and hand of a man, or an implement, may be inserted into the drying-tunnel at any point along its entire length to clear away any obstruction, such as a mass of dried fish-refuse, that might be a detriment to the proper working of the endless carrier within said tunnel. Upon the emerging of the dried fish-refuse from the evaporator tunnel, it is conducted by the endless carrier up the incline, $q$, to the wheel, $o'$, at the top thereof, and falls therefrom into a bin, barrel or some other suitable receptacle; the dried refuse is then ready for use in the manufacture of fertilizer.

Having thus described our invention, what we claim as new, and desire to secure by Letters Patent, is—

1. In an apparatus for drying fish-refuse, the combination of the straight drying-tunnel having top, bottom and sides and open at each end; a steam jacket for heating said tunnel; and an endless carrier mounted on suitable drums and having its upper stretch outside said drying-tunnel and its lower stretch passing through the tunnel along the top thereof and provided with tines or fingers which depend below and rake along the bottom of the tunnel.

2. The combination of the straight drying tunnel having top, bottom and sides and open at each end and provided at its top with a longitudinal slot extending along its entire length and having a movable cover; a steam jacket exteriorly surrounding the bottom and two sides of the said drying-tunnel for heating the same; and an endless chain carrier passing through said tunnel.

In testimony whereof we affix our signatures in the presence of two witnesses.

DANIEL F. OVERTON.
WILLIS E. OVERTON.

Witnesses:
CHARLES B. MANN, Jr.,
C. C. HINES.